United States Patent
Carlino et al.

(10) Patent No.: US 9,518,648 B2
(45) Date of Patent: Dec. 13, 2016

(54) STAKED PLANET PIN

(71) Applicant: Schaeffler Technologies AG & Co. KG, Herzogenaurach (DE)

(72) Inventors: Ryan Carlino, Charlotte, NC (US); Charles Schwab, Fort Mill, SC (US); Alfred Thomas, Mint Hill, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/639,213

(22) Filed: Mar. 5, 2015

(65) Prior Publication Data

US 2016/0258528 A1 Sep. 8, 2016

(51) Int. Cl.
*F16H 57/08* (2006.01)
*F16H 57/04* (2010.01)

(52) U.S. Cl.
CPC .......... *F16H 57/082* (2013.01); *F16H 57/043* (2013.01); *F16H 57/0479* (2013.01); *F16H 57/0482* (2013.01); *Y10T 29/49465* (2015.01)

(58) Field of Classification Search
None
See application file for complete search history.

(56) References Cited

U.S. PATENT DOCUMENTS

| | | | |
|---|---|---|---|
| 6,663,531 B2 | 12/2003 | Skrabs | |
| 8,172,718 B2 | 5/2012 | Buchner et al. | |
| 2006/0112531 A1 | 6/2006 | Skrabs | |
| 2009/0129891 A1* | 5/2009 | Shigesada | G09F 7/18 411/501 |
| 2010/0105515 A1* | 4/2010 | Goleski | F16H 57/082 475/341 |
| 2010/0151986 A1* | 6/2010 | Burgman | F16H 57/0479 475/348 |
| 2010/0313408 A1 | 12/2010 | Morlo | |
| 2014/0329636 A1* | 11/2014 | Heuver | F16H 57/082 475/331 |
| 2015/0330467 A1* | 11/2015 | Bourlon | B60T 13/745 475/149 |

FOREIGN PATENT DOCUMENTS

| | | | |
|---|---|---|---|
| FR | WO2014095966 | * | 6/2014 |
| GB | 949987 | | 2/1961 |
| JP | 5169164 | | 7/1993 |

* cited by examiner

*Primary Examiner* — Mark Manley
(74) *Attorney, Agent, or Firm* — Volpe and Koenig, P.C.

(57) ABSTRACT

A planetary pin used for staking in a planetary gear system is provided. The planetary pin comprises a cylindrical body, a first end having a first end surface, a second end having a second end surface, and a circular groove formed in at least one of the end surfaces concentric with the cylindrical body.

15 Claims, 4 Drawing Sheets

STAKED PLANET PIN

FIELD OF INVENTION

Embodiments of the present invention generally relate to planetary gear systems using planetary bearings in power transmission mechanisms. More specifically, embodiments of the present invention relate to a planetary pin adapted for staking at one or both ends, and a planetary pin assembly using same.

BACKGROUND

Some power transmission mechanisms, for example automotive transmissions, employ planetary gearsets having planet pins to support planetary gears for rotation. In some applications, it is desirable to rivet or stake the planet pins in place by deforming and enlarging one or both end of the planet pin. The end configuration of some known pins used in riveted or staked applications have a deep, centrally located conical recess formed in the staked end. The recess penetrates into the center portion of the body of the planetary pin. This configuration requires that the planetary pin be made longer to accommodate the conical recess, undesirably occupying more axial space within the transmission.

Some power transmission mechanisms, for example automotive transmissions, employ planetary gearsets requiring lubrication for reliable operation and thermal stability. In some transmissions, planet pins have fluid passages drilled through the pin body to deliver a lubrication fluid, for example oil, from a source such as an "oil dam" or a "lube catcher" to a raceway of a planetary bearing during operation. The flow of the oil requires rotation of the planetary gear carrier to generate centrifugal head to push the oil into the planet pin fluid passages.

In some new automotive transmissions, operating conditions exist in which the planetary gear carrier is stationary, making lubrication using the centrifugal head impossible. An alternate lubrication system is therefore needed.

Some current planetary gear systems may include a planet pin having a lubrication port formed at an acute angle through the pin wall to provide a flow of oil with a passage formed along the longitudinal axis of the pin. Drilling at an angle through bearing-grade steel can be a multi-step and complicated drilling operation.

Other systems require a series of intersecting passages selectively sealed with plugs to direct the flow. These systems require that the planet pin be fixed in the carrier for position and retention. Staking or riveting the planet pin in place is the preferred assembly method for some production requirements. However, current planet pins with intersecting passages cannot be staked due to the location of some passages, therefore increasing the assembly time and complexity. In known planetary gear systems with staked or riveted pins, the pins are made longer than necessary in order to accommodate the staking operation, thus undesirably taking up axial space in the transmission.

Therefore a need exists for a planet pin with oil passages for use in a planetary gear system that can be staked or riveted in place. A need also exists for a planet pin configured to be staked in place without increasing the length of the pin.

SUMMARY

Embodiments of a planet pin that can be staked or riveted in a planetary gear carrier of a planetary gear system and a planetary pin assembly using the planetary pin are provided. In an embodiment, the planetary pin for a planetary gear system comprises a cylindrical body having an outer surface, a first end surface at a first end, and a second end surface at a second end. A circular groove is formed in at least one of the first end surface or the second end surface, the circular groove concentric with the cylindrical body and displaced radially inwardly from the outer surface.

In one embodiment, a planetary pin assembly comprises a planetary carrier including a planetary pin receptacle and a lubricant supply passage. The assembly also includes a planetary pin comprising a cylindrical body having an outer surface, a first end surface at a first end, and a second end surface at a second end, and a circular groove formed in at least one of the first end surface or the second end surface, the circular groove concentric with the cylindrical body and displaced radially inwardly from the outer surface. The planetary pin is disposed in the planetary pin receptacle and fixed within the receptacle by staking.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1A:
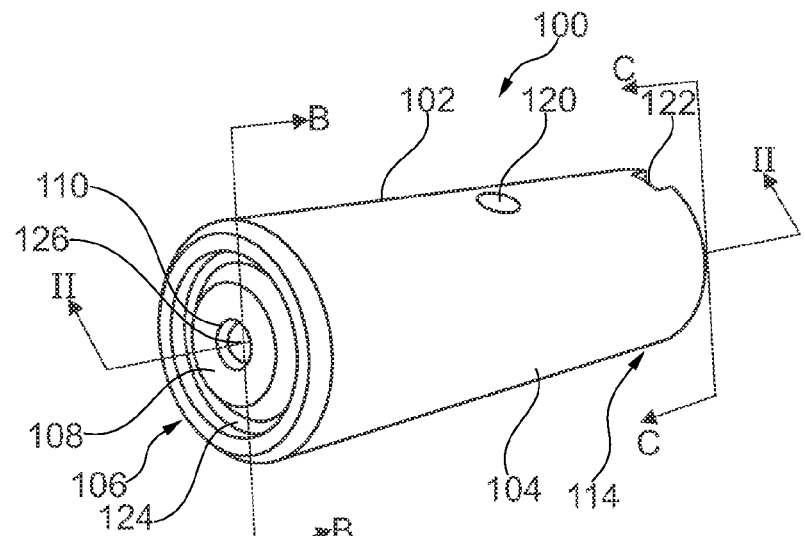
FIG. 1A is a perspective view of a planetary pin in accordance with an embodiment of the present disclosure.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to an automotive transmission, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "radially inwardly" and "radially outwardly" refer to directions radially toward and away from an axis of the part being referenced. "Axially" refers to a direction along the longitudinal axis of the part being referenced. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1B:
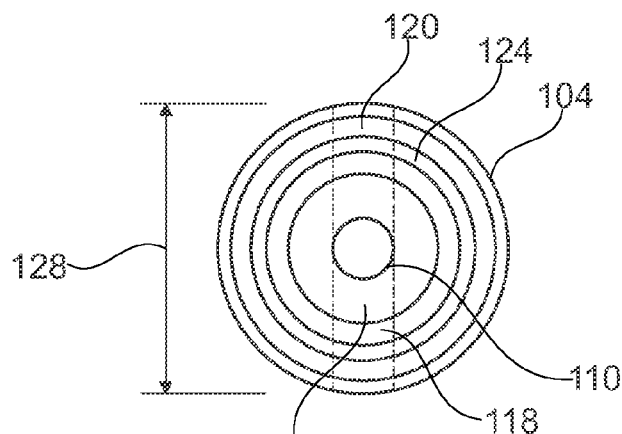
FIG. 1B is an end view of the planetary pin of FIG. 1A along B-B.
Figure 1C:
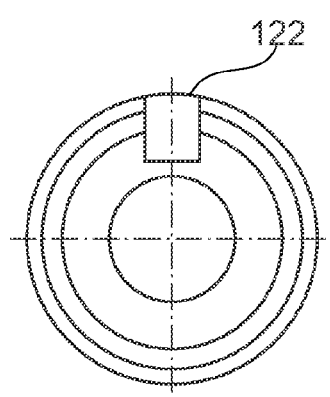
FIG. 1C is an end view of the planetary pin of FIG. 1A along C-C.

FIG. 1 depicts a perspective view of a planet pin 100 in accordance with an embodiment of the present invention. The pin 100 has a generally cylindrical body 102 with an outer surface 104 and a first end 106 with a first end surface 108. In this embodiment, the cylindrical body 102 has an axial passage 110 extending from the first end surface 108 as may be seen in the end view illustrated in FIG. 1B. The axial passage 110 is generally concentric with the longitudinal axis 204 (FIG. 2) of the planetary pin 100. A generally cylindrical inner surface 112 defines the circumferential bounds of the axial passage 110. The axial passage 110 may be formed by any suitable process, such as drilling. The cylindrical inner surface 112 of the axial passage 110 and the outer surface 104 form the bounds of wall thickness 116. The planetary pin 100 may be formed from any material suitable for supporting a bearing, for example bearing-grade steel.

Figure 2:
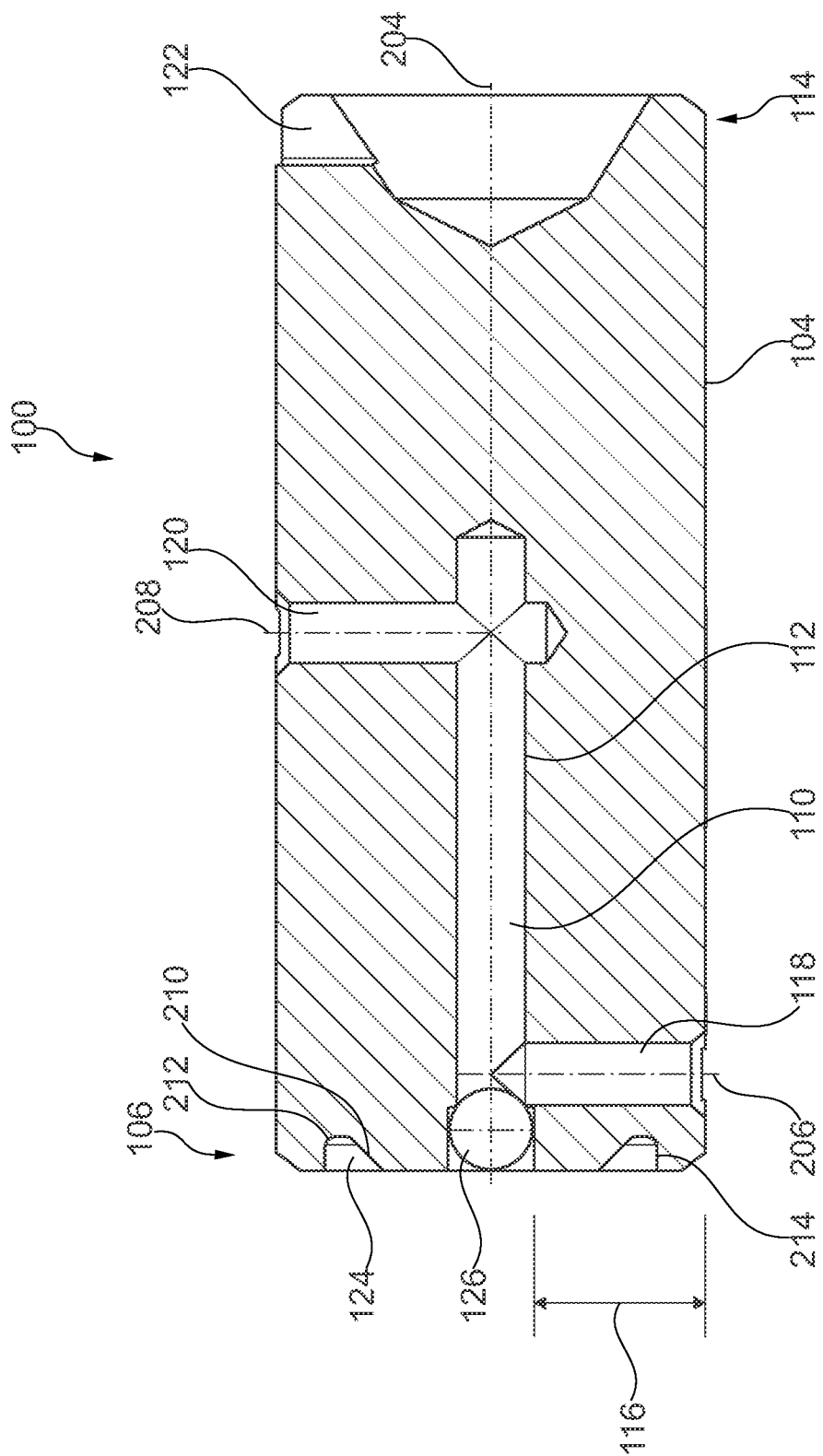
FIG. 2 is a side cross sectional view of the planetary pin of FIG. 1 taken along II-II.

A generally cylindrical radial passage 118 is formed through the wall thickness 116 proximate to the first end portion 106, and offset from the first end surface 108 along a longitudinal axis 204 (FIG. 2). The radial passage 118 is in fluid communication with the axial passage 110. The radial passage 118 may be formed by any suitable process, for example drilling, and may terminate at (as shown), or beyond the circumferential bounds of the axial passage 110. The radial passage 118 is formed so that the axis 206 of the radial passage 118 is perpendicular to the longitudinal axis 204 of the planetary pin 100. In other embodiments, the axis 206 may be oriented at an acute angle with the longitudinal axis 204.

A second generally cylindrical radial passage 120 is formed through the wall thickness 116 and offset from the radial passage 118 along a longitudinal axis 204 (FIG. 2). The radial passage 120 is in fluid communication with the axial passage 110 and may be formed by any suitable process, for example drilling, and may terminate at, or beyond (as shown) the circumferential bounds of the axial passage 110. The radial passage 120 is formed so that the axis 208 of the radial passage 120 is perpendicular to the longitudinal axis 204 of the planetary pin 100. In other embodiments, the axis 208 may oriented at an acute angle with the longitudinal axis 204.

In a preferred embodiment, the axes 206, 208 of the first and second radial passages 118, 120 are parallel and mutually perpendicular to the longitudinal axis 204 of the planetary pin 100. As such, the first radial passage 118 is angularly offset from the second radial passage 120 by about 180°.

As shown in FIG. 2, a plug 126 can be disposed within the axial passage 110 in the first end portion 106 of the planetary pin 100 to seal a first end of the axial passage 110. With the plug 126 installed, a fluid path is formed from the first radial passage 118, along the axial passage 110, to the second radial passage 120. In a preferred embodiment, the plug 126 is of a size and shape to form an interference fit with the axial passage 110 to substantially or completely seal a portion of the axial passage and to maintain engagement in the axial passage 110.

A locating feature, for example slot 122, may be formed in the second end portion 114 of the planetary pin 100 for indicating radial positioning of the pin about a longitudinal axis (e.g., longitudinal axis 204, FIG. 2). In the embodiment illustrated in FIGS. 1A-1C, the locating feature is a slot 122 formed from the outer surface 104 radially inwardly. In other embodiments, locating features of other configurations may be used at one or more of the first end portion 106 and the second end portion 114 to facilitate rotational orientation of the planet pin 100 during assembly operations.

The non-limiting embodiment illustrated in FIGS. 1A-2 includes a circular groove 124 formed in the first end surface 108, displaced radially inwardly from the outer surface 104. As illustrated in FIG. 2, the groove 124 is formed by an inner wall 210 which is radially outwardly sloping, the inner wall 210 starting at the first end surface 108 and terminating at the bottom wall 212. In the illustrated embodiment, the bottom wall 212 is generally parallel to the first end surface 108 and perpendicular to the longitudinal axis 204. In other embodiments, the bottom wall 212 may have other configurations, for example the bottom wall 212 may be a radius joining the inner wall 210 to the outer wall 214. The outer wall 214 of the groove 124 extends from the first end surface 108 to the bottom wall 212 and is generally perpendicular to the bottom wall 212 and parallel to the outer surface 104.

As illustrated, the groove 124 has an inner radially outwardly sloping wall 210 and an outer, non-radially sloping wall 214. Other embodiments may include two radially sloping walls, one inwardly sloping and one outwardly sloping. In other embodiments, neither the inner nor the outer wall may be radially sloping. Further as illustrated, the planetary pin 100 has the groove formed at the first end portion 106. In other embodiments, the groove 124 may be formed at the second end portion 114, or at both the first and second end portions 106, 114.

The groove 124 is formed to engage with a tool (not shown) to facilitate staking or riveting, collectively staking, the planetary pin in a receptacle. As used herein, "staking" is used to mean deformation, by expanding, of an end portion of a planetary pin using a tool. In the non-limiting example illustrated in FIGS. 1A-2, the planetary pin 100 would be staked in place by placing the pin in a receptacle with the groove 124 engaged by a tool. By engaging the groove 124 and compressing the planetary pin 100, or repeatedly striking a portion of the groove 124, the tool may cause the first end portion of the pin to deform outwardly, increasing the diameter 128 at least at the end portion 106. The increased diameter forms an interference fit with an inner portion of the receptacle, fixing the planetary pin in place. Roller swaging or staking can also be used.

Figure 3:
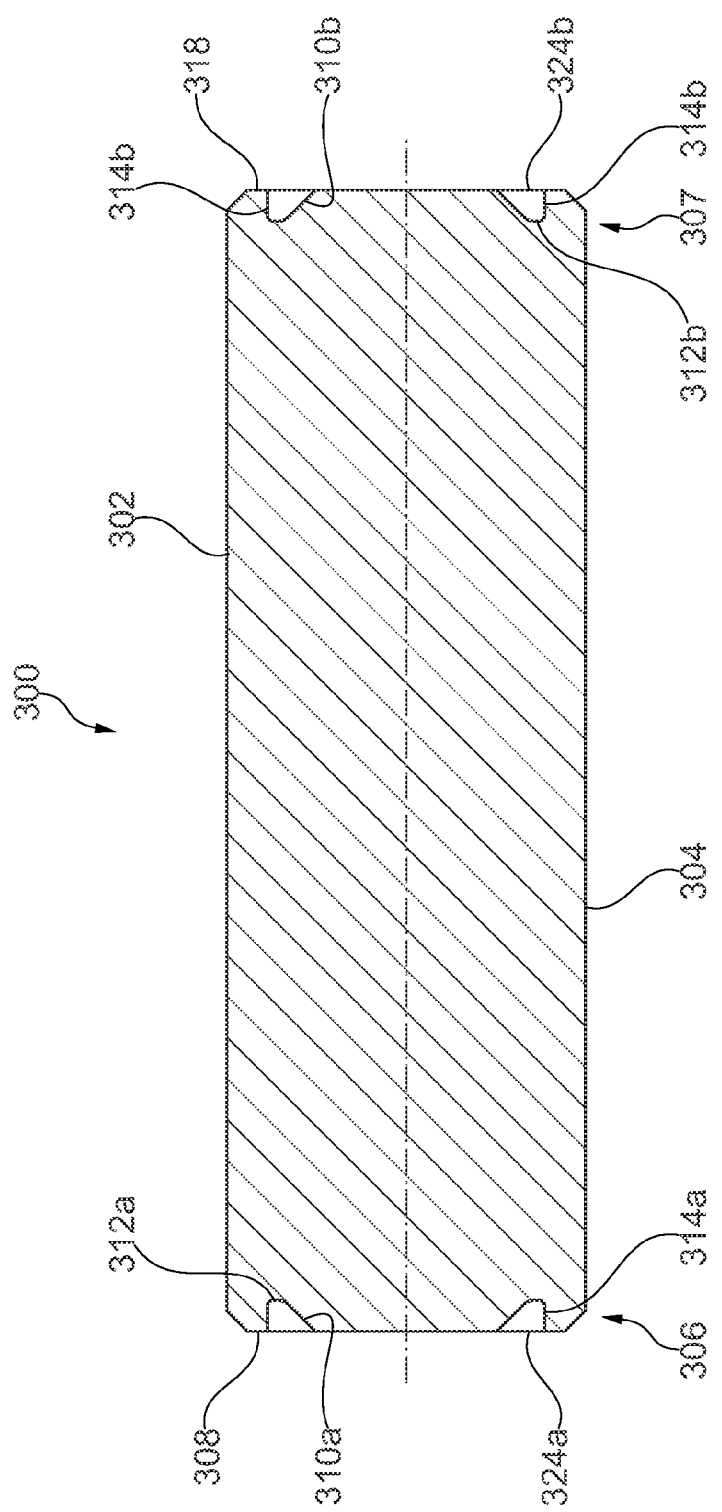
FIG. 3 is a side cross sectional view of a planetary pin in accordance with an embodiment of the present disclosure.

In an alternate embodiment illustrated in FIG. 3, a pin 300 has a generally cylindrical body 302 with an outer surface 304. A first end portion 306 of the pin has a first end surface 308, and a second end portion 307 has a second end surface 318. A circular groove 324a is formed in the first end surface 308 and comprises inner wall 310a, bottom wall 312a, and outer wall 314a. A circular groove 324b is formed in the second end surface 318 and comprises inner wall 310b, bottom wall 312b, and outer wall 314b. The grooves 324a, 324b may be similarly formed as shown, or may have different configuration. One or both end portions 306, 307 may be staked as discussed above.

Figure 4:
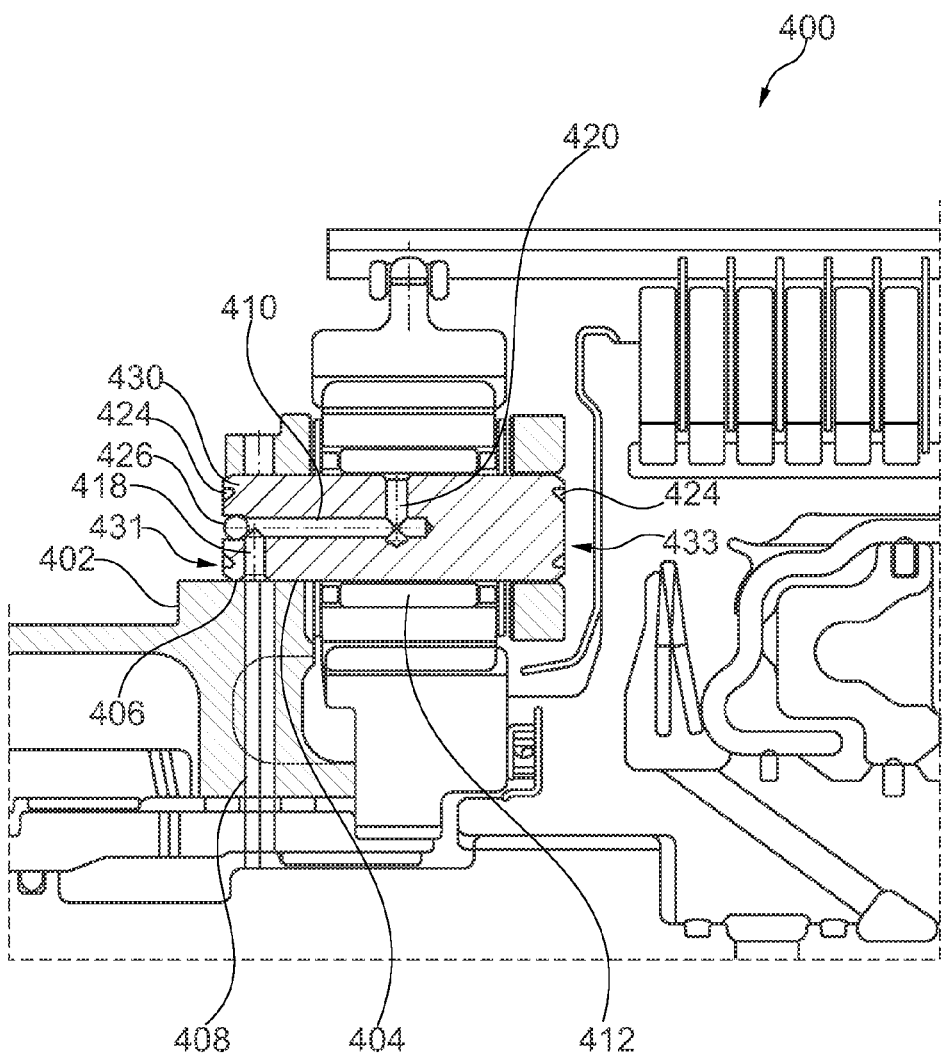
FIG. 4 is a partial sectional side view of a portion of a planetary pin assembly in accordance with an embodiment of the present invention.

FIG. 4 depicts a planetary pin assembly 400 including a planetary carrier 402 and a planetary pin 430. The planetary carrier 402 includes a planetary pin receptacle 406 in which the planetary pin 430 is disposed. The planetary pin receptacle 406 in the embodiment of FIG. 4 is formed as a through hole having a cylindrical side wall 404 defining the hole. Other hole configurations could be used with similar beneficial results.

The planetary pin 430 illustrated in FIG. 4 has some features similar to the embodiment illustrated in FIG. 2. The pin 430 includes an axial passage 410 and first and second radial passages 418, 420, respectively, similar in construction to the embodiment of FIG. 2. The planetary pin 430 illustrated in FIG. 4 also has some features similar to the embodiment illustrated in FIG. 3. As illustrated in FIG. 4, the planetary pin 430 includes grooves 424 at either end (i.e., first end 431 and second end 433), similar to grooves 324a and 324b of FIG. 3. As the receptacle 406 is formed as a through hole, both ends 431, 433 of the planetary pin 430 are accessible by a tool for staking. Thus, in the assembly of FIG. 4, the planetary pin 430 may be staked at one end (431 or 433) or both ends (431 and 433) to prevent, or substantially prevent, one or more of axial or rotational displacement with respect to the planetary carrier 402.

In the assembly, first radial passage 418 is positioned to be in fluid communication with a lubricant supply passage 408 and the second radial passage 420 is in fluid communication with a bearing 412 disposed on the planetary pin 430. The planetary pin is held in the receptacle and fixed against axial or angular displacement with respect to the planetary carrier by staking. The lubricant flows in the first radial passage 418 and is directed to flow along the axial passage 410 because the first end of the axial passage is blocked with plug 426. The lubricant exits the axial passage 410 through the second radial passage 420 and flows into the bearing 412.

In other embodiments, the planetary pin 430 can be constructed as illustrated in FIG. 3 with a circular groove (for example 324a, 324b) formed in one or both end surfaces (for example 308 or 318).

Thus a planetary pin and a planetary pin assembly are provided herein. The planetary pin can be staked in place and have oil passages through the pin body to direct lubricant to a planetary gear system. Because of the configuration of the staked end or ends, the planetary pin length may be reduced over known planetary pins with similar lubrication delivery features. The planet pin is configured to be staked in place at one or both ends without increasing the length of the planetary pin, beneficially reducing space requirements within a power transmission mechanism. The inventive planetary pin may also advantageously eliminate complicated machining operations in production of the pin, beneficially reducing manufacturing costs.

What is claimed is:

1. A planetary pin for use in a planetary gear system, the planetary pin comprising:
   a cylindrical body having an outer surface, a first end surface at a first axial end, and a second end surface at a second axial end; and
   a circular groove formed in at least one of the first end surface or the second end surface, the circular groove concentric with the cylindrical body and displaced radially inwardly from the outer surface, wherein the circular groove comprises a radially inwardly sloped radial inner wall, a generally flat bottom wall perpendicular to a longitudinal axis of the planetary pin, and a radial outer wall generally parallel to the outer surface.

2. The pin of claim 1, wherein the cylindrical body further comprises:
   an axial passage extending from the first axial end, and a wall thickness between the axial passage and the outer surface;
   a first radial passage proximate to the first axial end formed through the wall thickness and in fluid communication with the axial passage; and
   a second radial passage axially displaced from the first radial passage in a direction of the second axial end, the second radial passage formed through the wall thickness and in fluid communication with the axial passage.

3. The pin of claim 2, wherein the first radial passage is angularly offset from the second radial passage by about 180°.

4. The pin of claim 2, further comprising a plug disposed in the axial passage at the first axial end, the plug and the axial passage forming an interference fit.

5. The pin of claim 1, wherein the groove is configured to facilitate radial expansion of the first axial end of the planetary pin when the groove is contacted with a tool for axially compressively loading the planetary pin.

6. The pin of claim 1, further comprising a locating feature at one of the first axial end or the second axial end for indicating radial positioning of the pin about a longitudinal axis.

7. A planetary pin assembly comprising:
   a planetary carrier including a planetary pin receptacle and a lubricant supply passage; and
   a planetary pin comprising:
   a cylindrical body having an outer surface, a first end surface at a first axial end, and a second end surface at a second axial end; and
   a circular groove formed in at least one of the first end surface or the second end surface, the circular groove concentric with the cylindrical body and displaced radially inwardly from the outer surface,
   wherein the planetary pin is disposed in the planetary pin receptacle and fixed within the receptacle by staking, and the circular groove comprises a radially inwardly sloped radial inner wall, a generally flat bottom wall perpendicular to a longitudinal axis of the planetary pin, and a radial outer wall generally parallel to the outer surface.

8. The assembly of claim 7, wherein the cylindrical body further comprises:
   an axial passage extending from the first axial end, and a wall thickness between the axial passage and the outer surface;
   a first radial passage proximate to the first axial end formed through the wall thickness and in fluid communication with the axial passage; and
   a second radial passage axially displaced from the first radial passage in a direction of the second axial end, the second radial passage formed through the wall thickness and in fluid communication with the axial passage, wherein the first radial passage is in fluid communication with the lubricant supply passage.

9. The assembly of claim 8, wherein the first radial passage is angularly offset from the second radial passage by about 180°.

10. The assembly of claim 8, wherein the second radial passage is in fluid communication with a bearing disposed on the planetary pin.

11. The assembly of claim 8, further comprising a plug disposed in the axial passage at the first axial end, the plug and the axial passage forming an interference fit.

12. The assembly of claim 7, wherein the planetary pin is staked at the corresponding one of the first end surface or the second end surface having the circular groove.

13. The assembly of claim 7, wherein the receptacle is formed as a through hole.

14. The assembly of claim 7, wherein the circular groove is formed in the first end surface and in the second end surface, and the planetary pin is staked at the first axial end and at the second axial end.

15. The assembly of claim 7, wherein the planetary pin includes a locating feature at one of the first axial end or the second axial end for indicating radial positioning of the pin about a longitudinal axis.

* * * * *